United States Patent
Wu et al.

(10) Patent No.: US 8,274,747 B2
(45) Date of Patent: Sep. 25, 2012

(54) PIEZOELECTRIC ACTUATOR, CAMERA MODULE, AND PORTABLE ELECTRONIC DEVICE HAVING SAME

(75) Inventors: Ting-Yuan Wu, New Taipei (TW); Chi-Wei Chiu, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 46 days.

(21) Appl. No.: 13/086,403

(22) Filed: Apr. 14, 2011

(65) Prior Publication Data
US 2012/0140346 A1 Jun. 7, 2012

(30) Foreign Application Priority Data
Dec. 7, 2010 (TW) .................................. 99142518

(51) Int. Cl.
*G02B 7/02* (2006.01)
(52) U.S. Cl. .................... 359/824; 359/811; 359/822
(58) Field of Classification Search .................... 359/824
See application file for complete search history.

(56) References Cited

U.S. PATENT DOCUMENTS
2012/0140345 A1* 6/2012 Chiu ............................ 359/824
* cited by examiner

*Primary Examiner* — James Jones
(74) *Attorney, Agent, or Firm* — Altis Law Group, Inc.

(57) ABSTRACT

An exemplary piezoelectric actuator includes a fixed barrel, a movable barrel in the fixed barrel, a piezoelectric driving module, a flexible circuit board on the fixed barrel, a bracing sheet, and a preloading module. The movable barrel receives a lens module. The driving module drives the movable barrel to move relative to the fixed barrel along an optical axis of the lens module. The driving module includes a piezoelectric member on the fixed barrel, and a friction member on the movable barrel and opposite to the friction member. The flexible circuit board is electrically connected with the piezoelectric member. The sheet is attached around the flexible circuit board. The preloading module is between the fixed barrel and the movable barrel. The preloading module is opposite to the piezoelectric driving module for exerting a pressure on the movable barrel, thereby making the friction member resist against the piezoelectric member.

20 Claims, 6 Drawing Sheets

PIEZOELECTRIC ACTUATOR, CAMERA MODULE, AND PORTABLE ELECTRONIC DEVICE HAVING SAME

CROSS-REFERENCE TO RELATED APPLICATIONS

The present application is related to a copending U.S. patent application, titled "PIEZOELECTRIC ACTUATOR, CAMERA MODULE HAVING SAME AND PORTABLE ELECTRONIC DEVICE HAVING SAME", with the application Ser. No. 13/072,762 assigned to the same assignee as the present application, the disclosure of which is incorporated herein by reference in its entirety.

BACKGROUND

1. Technical Field

The present disclosure relates to actuators and particularly, to a piezoelectric actuator and camera module having the piezoelectric actuator, with a portable electronic device having such camera module.

2. Description of Related Art

With the development of optical imaging technology, camera modules are widely used in a variety of portable electronic devices, such as mobile phones, and personal digital assistants (PDAs).

Some portable electronic devices, for example, third generation (3G) mobile phones, include camera modules. The camera modules use actuators to provide zoom and autofocus, for example, stepper motors. It is frequently necessary to use a gear assembly to transform the rotational movement of the actuators into linear movement. However, such a gear assembly generally increases the bulk of the camera modules. Furthermore, the occurrence of backlash/recoil in the gear assembly may degrade focus accuracy.

Therefore, what is needed is an actuator and camera module using the new actuator that can overcome the described limitations.

DETAILED DESCRIPTION

Embodiments will now be described in detail below with reference to drawings.

Figure 1:
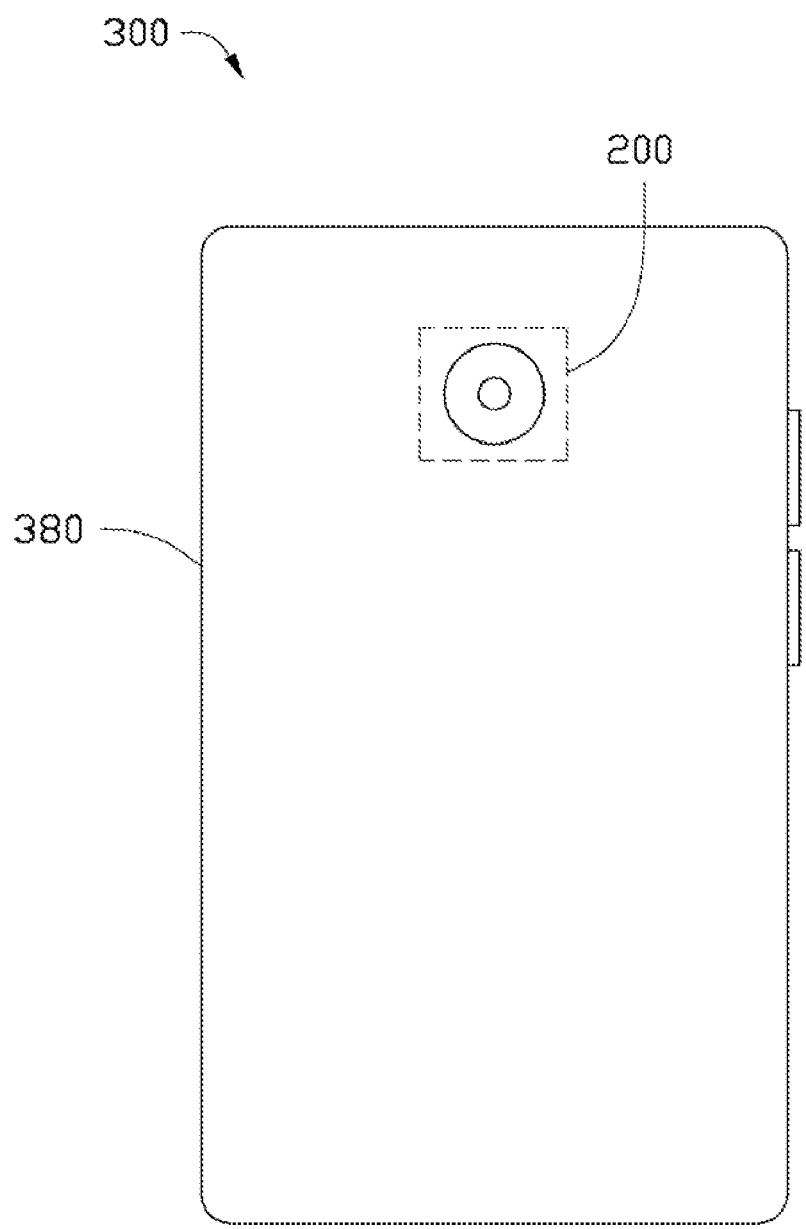
FIG. 1 is an isometric view of a portable electronic device according to an exemplary embodiment.

Referring to FIG. 1, a portable electronic device 300, in accordance with an exemplary embodiment, is shown. The portable electronic device 300 includes a main body 380 and a camera module 200 mounted on the main body 380.

Figure 2:
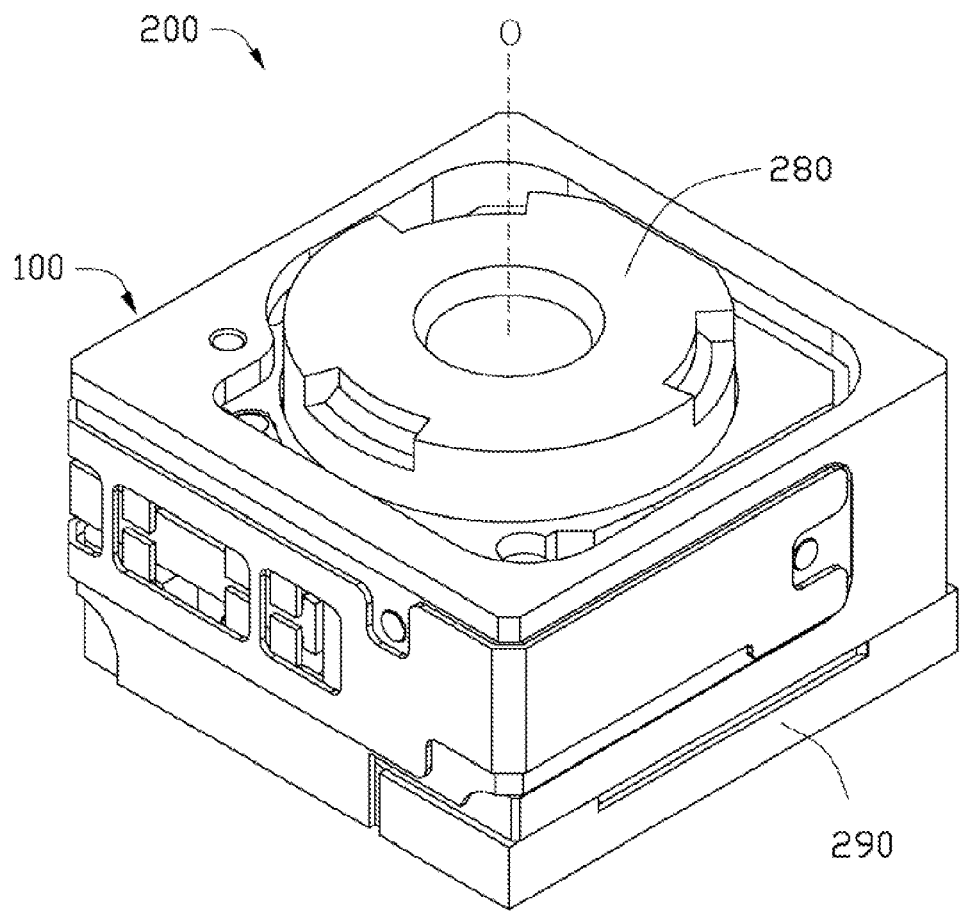
FIG. 2 is an isometric view of a camera module of the portable electronic device of FIG. 1.
Figure 3:
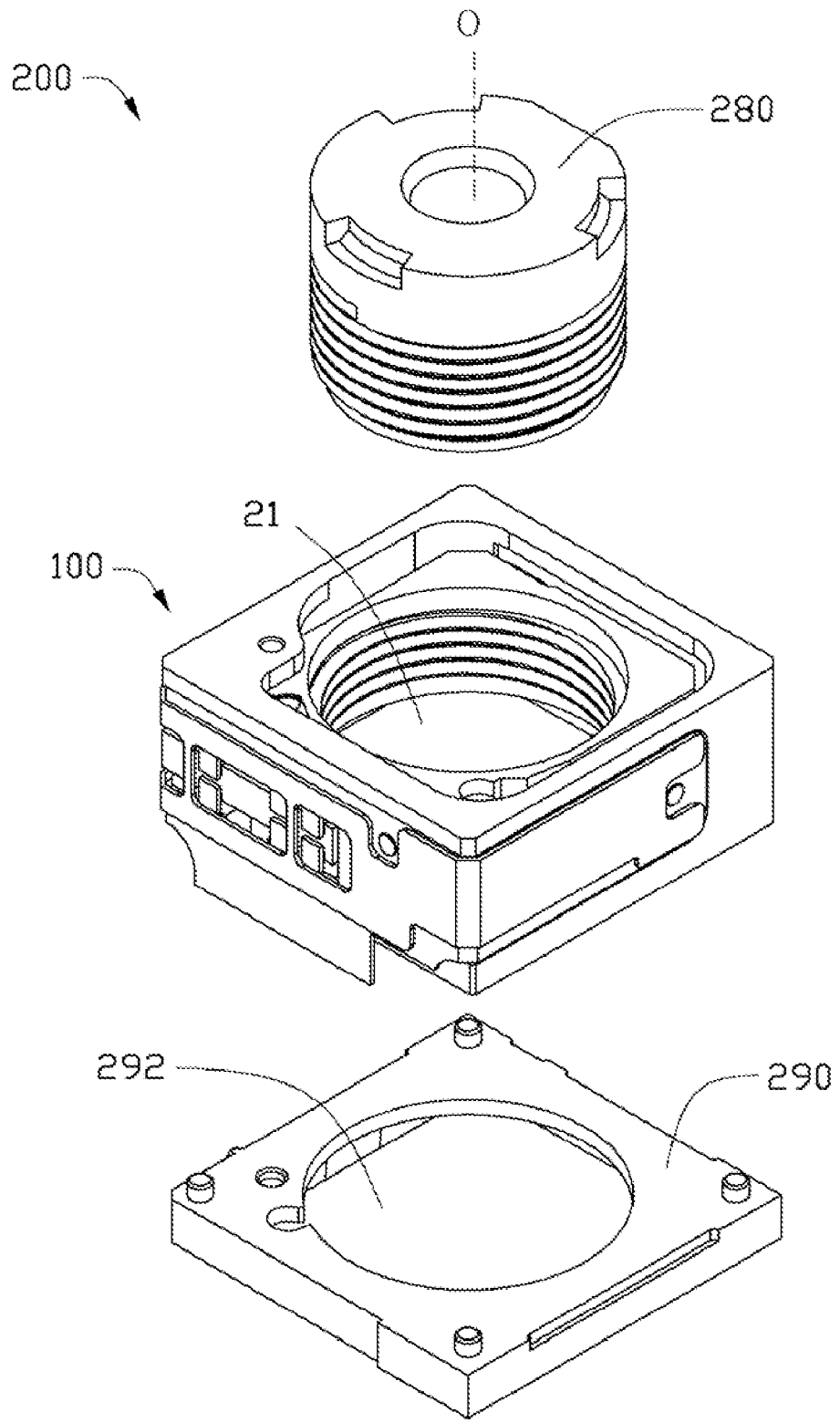
FIG. 3 is an exploded and isometric view of the camera module of FIG. 2.

Referring to FIGS. 2-3, the camera module 200 includes a piezoelectric actuator 100, a lens module 280 receiving at least one lens (not labeled), and a supporting base 290 defining a light incident hole 292 for allowing the light from the lens module 280 to pass the supporting base 290. The supporting base 290 is configured for supporting the piezoelectric actuator 100.

Figure 4:
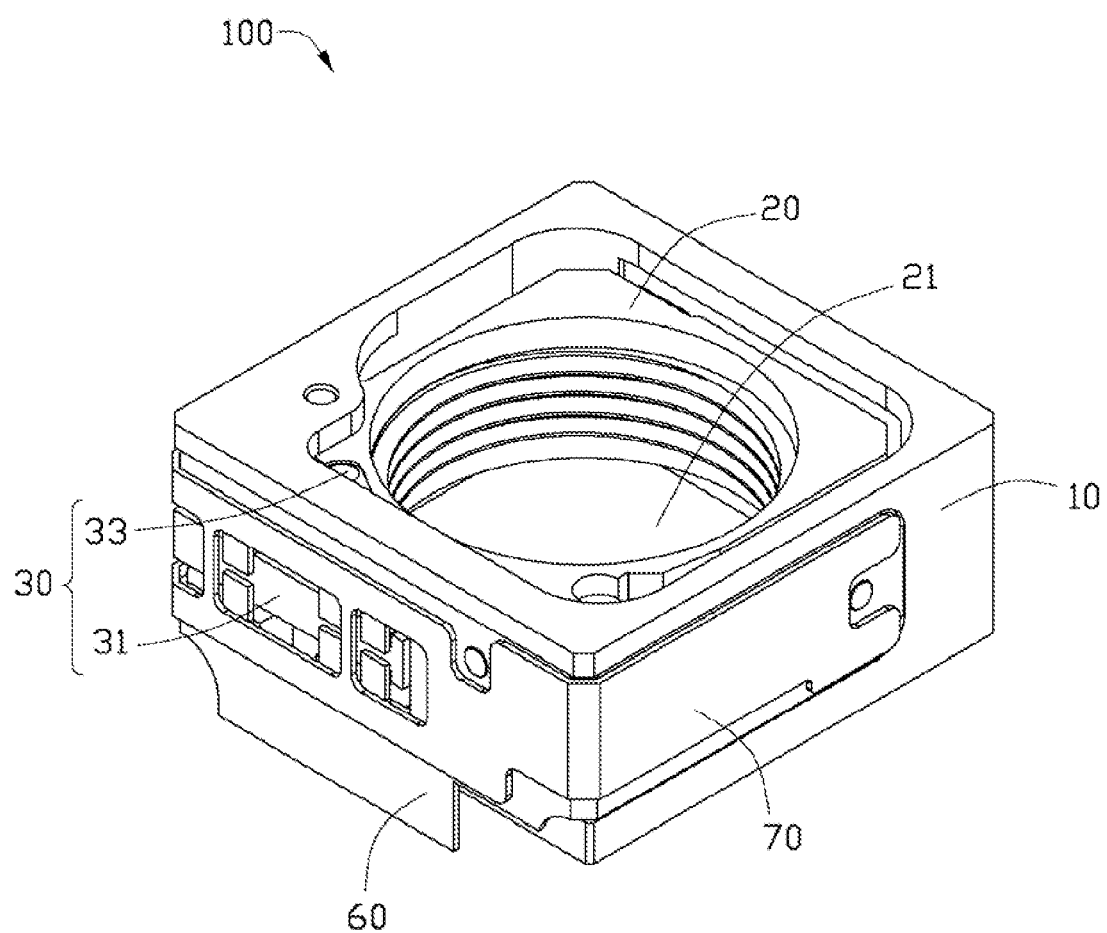
FIG. 4 is an isometric view of a piezoelectric actuator of the camera module of FIG. 3.
Figure 5:
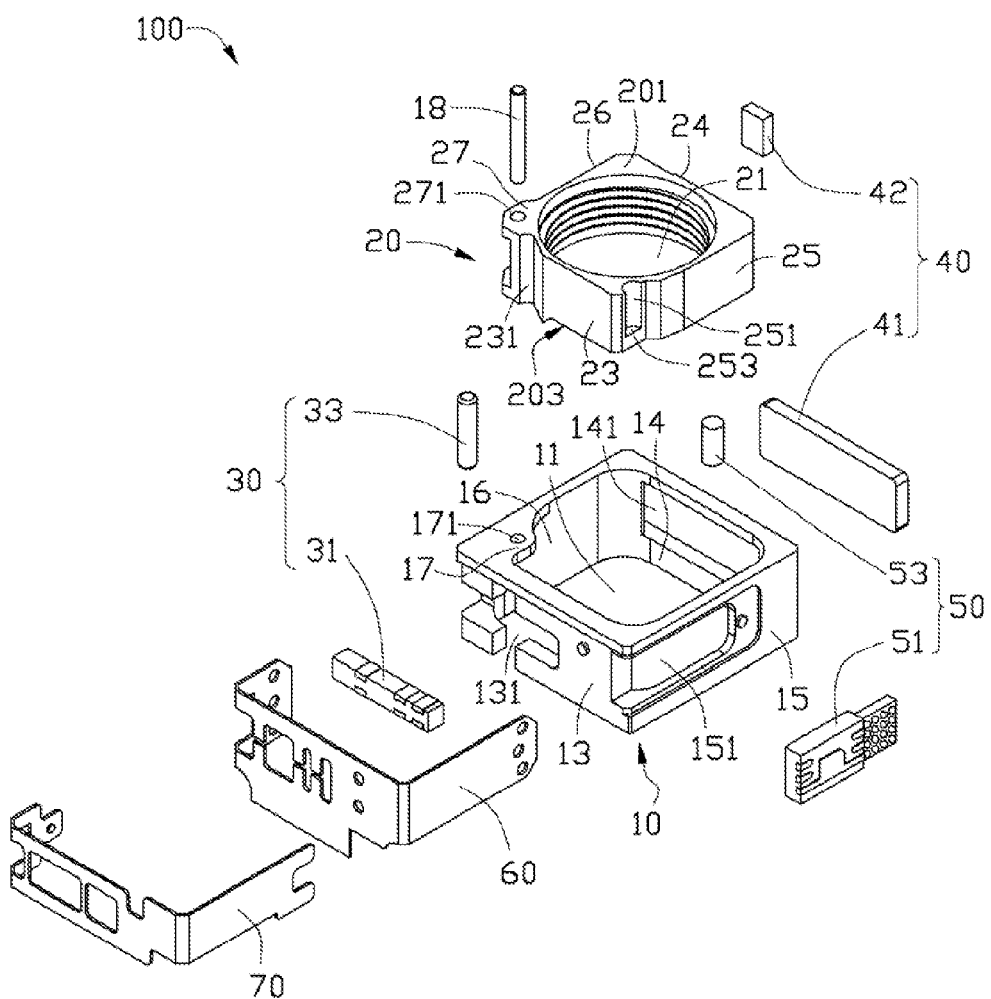
FIG. 5 is an exploded and isometric view of the piezoelectric actuator of FIG. 4.
Figure 6:
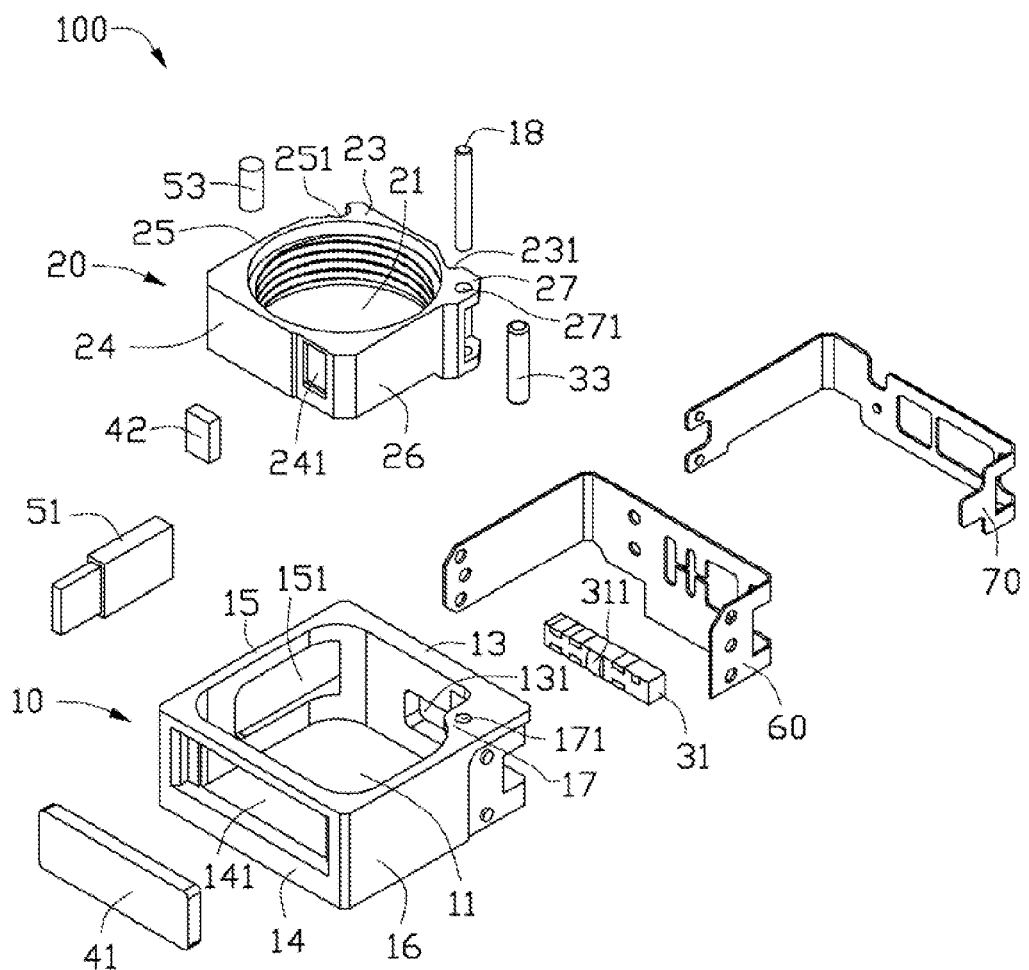
FIG. 6 is similar to FIG. 5, but viewed from another aspect.

Referring also to FIGS. 4-6, the piezoelectric actuator 100 includes a fixed barrel 10, a movable barrel 20, a piezoelectric driving module 30, a preloading module 40, a detecting module 50, a flexible circuit board 60, and a bracing sheet 70.

The fixed barrel 10 defines a first receiving cavity 11 passing through two opposite ends thereof. The first receiving cavity 11 is configured for receiving the movable barrel 20. In the present embodiment, the fixed barrel 10 is substantially cubic, and includes a first sidewall 13, a second sidewall 14 opposite to the first sidewall 13, a third sidewall 15, and a fourth sidewall 16 opposite to the third sidewall 15. The first sidewall 13, second sidewall 14, third sidewall 15, and fourth sidewall 16 cooperatively define the first receiving cavity 11. In alternative embodiments, the fixed barrel 10 may be other shapes, such as cylindrical, pentagonal, or prismatic.

A first receiving recess 131 is defined in the first sidewall 13, a second receiving recess 141 is defined in the second sidewall 14, and a third receiving recess 151 is defined in the third sidewall 15. In the present embodiment, the first receiving recess 131 passes through the first sidewall 13 and communicates with the first receiving cavity 11; the second receiving recess 141 passes through the second sidewall 14 and communicates with the first receiving cavity 11; the third receiving recess 151 passes through the third sidewall 15 and communicates with the first receiving cavity 11.

The fixed barrel 10 also includes a first flange 17 inwardly extending from a part of one end. In the present embodiment, the first flange 17 is at a corner of the fixed barrel 10, which is formed by the first sidewall 13 and the fourth sidewall 16. The first flange 17 is parallel with the end surface of the fixed barrel 10, and perpendicular to the central axis of first receiving cavity 11. A first guiding hole 171 is defined in the first flange 17 for receiving a guiding post 18, such that the movement of the movable barrel 20 can be guided along the guiding post 18. The first guiding hole 171 passes through the first flange 17, and the central axis of the first guiding hole 171 is parallel with an optical axis O of the lens module 280.

The movable barrel 20 is movably received in the first receiving cavity 11. The movable barrel 20 defines a second receiving cavity 21 passing through two opposite ends (i.e. the top end 201 and the bottom end 203). The second receiving cavity 21 is configured for receiving the lens module 280.

In the present embodiment, the movable barrel 20 is substantially cuboid, and includes a fifth sidewall 23, a sixth sidewall 24 opposite to the fifth sidewall 23, a seventh sidewall 25, and an eighth sidewall 26 opposite to the seventh sidewall 25. The fifth sidewall 23, sixth sidewall 24, seventh sidewall 25, and eighth sidewall 26 cooperatively define the second receiving cavity 21. In alternative embodiments, the movable barrel 20 may be other shapes, such as cylindrical, pentagonal, or prismatic.

The outer surface of the fifth sidewall 23 defines a first recess 231. The central axis of the first recess 231 is parallel with the optical axis O of the lens module 280. In the present embodiment, the first recess 231 is at a corner of the movable barrel 20, formed by the eighth sidewall 26 and the fifth sidewall 23, and has semi-cylindrical structure. The first recess 231 passes through the two ends of the fixed barrel 10. In alternative embodiment, one end of the first recess 231 may not pass through the top end surface of the top end 201 or the bottom end surface of the bottom end 203.

The outer surface of the sixth sidewall 24 defines a second recess 241 (see FIG. 6) opposite to the second receiving recess 141. In the present embodiment, the second recess 241 is a cubic recess, and the second recess 241 and the first recess 231 are on the same line parallel with the eighth sidewall 26.

The outer surface of the seventh sidewall 25 defines a third recess 251. The central axis of the third recess 251 is parallel with the optical axis O of the lens module 280. In the present embodiment, the third recess 251 is at a corner of the movable barrel 20, formed by the seventh sidewall 25 and the fifth sidewall 23, and has a semi-cylindrical structure. The top end of the third recess 251 passes through the top end surface of the top end 201, and the bottom end of the third recess 251 but does not pass through the bottom end surface of the bottom 203, such that a supporting bottom 253 is formed in the third recess 253.

The movable barrel 20 also includes two second flanges 27 outwardly extending from parts of the two end surfaces of the top end 201 and the bottom end 203. The second flanges 27 are opposite to each other. In the present embodiment, the second flanges 27 are parallel with each other, and are at a corner of the movable barrel 20, formed by the eighth sidewall 26 and the fifth sidewall 23. Each second flange 27 defines a second guiding hole 271 passing therethrough. The two second guiding holes 271 are coaxial with each other, and the central axes of the two second guiding holes 271 are parallel with the optical axis O of the lens module 280.

When the guiding post 18 passes through the first guiding hole 171, the two second guiding holes 271 in that order, one end of the guiding post 18 is securely fixed on an inner peripheral surface of the first guiding hole 171 by adhesive (not shown). Accordingly, the guiding post 18 is parallel with the optical axis O of the lens module 280, and the movable barrel 20 can be guided by the guiding post 18 to move relative to the fixed barrel 10 along the optical axis O.

The piezoelectric driving module 30 includes a piezoelectric member 31 attached on the sidewall of the fixed barrel 10, and a friction member 33 attached on the sidewall of the movable barrel 20.

The piezoelectric member 31 is opposite to the friction member 33. In the present embodiment, the piezoelectric member 31 is received in the first receiving recess 131. The piezoelectric member 31 includes a semi-cylindrical friction portion 311 (see FIG. 6). The axis of the semi-cylindrical friction portion 311 is perpendicular to the optical axis O. The friction portion 311 opposes the fifth sidewall 23, and is opposite to the first recess 231 of the fifth sidewall 23.

The friction member 33 is a substantially cylinder, and is securely received in the first recess 231. The friction member 33 is coaxial with the first recess 231, and resists against the semi-circumference of the friction portion 311. In the present embodiment, the friction member 33 is made of stainless steel. In alternative embodiments, the friction member 33 may be made of a ceramic or metallic material having excellent wear resistance and a relatively large friction coefficient.

When the piezoelectric member 31 is powered with current, the piezoelectric member 31 deforms, thereby making the friction portion 311 generate elliptical vibrations. Then, a friction force is generated between the friction portion 311 and the friction member 33 to drive the movable barrel 20 with the lens module 280 to move relative to the fixed barrel 10 along the guiding post 18 (i.e. the optical axis O), thereby achieving auto-focusing function.

It is understood that when the movable barrel 10 moves along the guiding post 18, the first flange 17 can limit the movement of the movable barrel 10, such that dislocation of the movable barrel 10 can be avoided.

The preloading module 40 is arranged between the fixed barrel 10 and movable barrel 20, and is opposite to the piezoelectric driving module 30. The preloading module 40 is configured for exerting a pressure on the movable barrel 20, such that the friction member 33 always resists against the friction portion 311. In the present embodiment, the preloading module 40 includes a magnetic member 41 and a second magnetic member 42. The first magnetic member 41 is received in the second receiving recess 141, and opposes the movable barrel 20. The second magnetic member 42 is received in the second recess 241, and opposes the first magnetic member 41. In the present embodiment, the N pole of the first magnetic member 41 opposes the N pole of the second magnetic member 42, such that a repelling force is generated between the first magnetic member 41 and the second magnetic member 42. Accordingly, the repelling force can push the fifth sidewall 23 towards the first sidewall 13, thereby making the friction member 33 resist against the friction portion 311 all the time. In the present embodiment, the first magnetic member 41 and the second magnetic member 42 are permanent magnets, and the proportion of lengthwise space between the first magnetic member 41 and the second magnetic member 42 along the central axis of the second receiving cavity 21 is three to two. Accordingly, a better repelling force between the first magnetic member 41 and the second magnetic member 42 can be generated.

The detecting module 50 is configured for detecting the movement of the movable barrel 20, and includes a Hall sensor 51 and a third magnetic member 53 spatially opposite to the third magnetic member 53 and attached on the movable barrel 20.

The Hall sensor 51 is attached on the inner surface of the fixed barrel 10, and is away from the first magnetic member 41 and the second magnetic member 42. The Hall sensor 51 is configured for sensing a change of magnetic field caused by the movement of the magnetic member 53, such that the movement of the movable barrel 20 can be sensed. In the present embodiment, the Hall sensor 51 is received in the third receiving recess 151. The third magnetic member 53 is received in the third recess 251, and is supported by the supporting bottom 253. In the present embodiment, the third magnetic member 53 is a cylindrical permanent magnet, and the central axis of the third magnetic member 53 is parallel with the optical axis O.

The flexible circuit board 60 is attached on the outer surface of the fixed barrel 10. In the present embodiment, the flexible circuit board 60 is a U-shaped board, and is attached on the outer surface of the first sidewall 13, the third sidewall 15, and the fourth sidewall 16. The flexible circuit board 60 is electrically connected to the piezoelectric member 31 and the Hall sensor 51, respectively. Accordingly, the flexible circuit board 60 can supply current to the piezoelectric member 31, and transfers signals from the Hall sensor 51 to a processer (not shown) of the piezoelectric actuator 100. In other embodiments, the flexible circuit board 60 may of other shapes, such as L-shaped, half-ring shaped.

The bracing sheet 70 is attached on the outside of the fixed barrel 10. The structure of the bracing sheet 70 is similar to that of the flexible circuit board 60, and the bracing sheet 70 is attached around the flexible circuit board 60, such that the flexible circuit board 60 can be protected from damage or contamination. The bracing sheet 70 is configured for fixing the piezoelectric member 31 in the first receiving recess 131, thereby preventing the piezoelectric member 31 from sliding off the first receiving recess 131. In addition, the bracing sheet 70 can constrain a deformation direction of the piezoelectric member 31, such that a maximum friction force can be generated by the friction member 33 and the friction portion 311 for driving the friction member 33 to move along the optical axis O. In the present embodiment, the thickness of the bracing sheet 70 is in a range from about 0.1 millimeters to about 0.2 millimeters, and the bracing sheet 70 is adhered to the flexible circuit board 60.

In operation, the preloading module 40 exerts a pressure on the movable barrel 20, such that the friction member 33 resists against the piezoelectric member 31 all the time. When the piezoelectric member 31 with current flowing therein deforms, the deformed piezoelectric member 31 can drive the friction member 33 with the movable barrel 20 to move relative to the fixed barrel 10 along the guiding post 18. Accordingly, loss of driving energy is lowered. In addition, because the piezoelectric member 31 is attached on the sidewall of the fixed barrel 10, the friction member 33 is attached on the sidewall of the movable barrel 20, and the preloading module 40 is attached on the sidewalls of the movable barrel 20 and the fixed barrel 10, the transverse space of the actuator 100 is well used. Accordingly, the actuator 100 is very compact.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A piezoelectric actuator comprising:
a fixed barrel, the fixed barrel defining a first receiving cavity passing through two opposite ends thereof;
a movable barrel received in the first receiving cavity, the movable barrel defining a second receiving cavity passing through two opposite ends thereof for receiving a lens module therein;
a piezoelectric driving module for driving the movable barrel to move relative to the fixed barrel along an optical axis of the lens module, the piezoelectric driving module comprising a piezoelectric member arranged on a sidewall of the fixed barrel, and a friction member arranged on a sidewall of the movable barrel, the piezoelectric member being opposite to the friction member;
a flexible circuit board fixed on an outer surface of the fixed barrel, the flexible circuit board being electrically connected with the piezoelectric member;
a bracing sheet, the bracing sheet being attached around the flexible circuit board and fixing the piezoelectric member on the fixed barrel, and
a preloading module arranged between the fixed barrel and the movable barrel, the preloading module being opposite to the piezoelectric driving module for exerting a pressure on the movable barrel, thereby making the friction member resist against the piezoelectric member.

2. The piezoelectric actuator of claim 1, further comprising a guiding post parallel with the optical axis, the guiding post extending through the movable barrel to guide the movable barrel to move therealong.

3. The piezoelectric actuator of claim 1, wherein the piezoelectric member comprises a semi-cylindrical friction portion, the axis of the semi-cylindrical friction portion is perpendicular to the optical axis, and the friction member resists against the semi-circumference of the friction portion.

4. The piezoelectric actuator of claim 1, wherein the friction member has a cylindrical structure, and the central axis of the friction member is parallel with the optical axis.

5. The piezoelectric actuator of claim 1, wherein the preloading module includes a first magnetic member attached on the fixed barrel, and a second magnetic member attached on the movable barrel, the first magnetic member is opposite to the second magnetic member, and the first magnetic member and the second magnetic member are configured to generate a repel force.

6. The piezoelectric actuator of claim 5, wherein the fixed barrel comprises a first sidewall and a second sidewall opposite to the first sidewall, the first sidewall defines a first receiving recess communicating with the first receiving cavity, the second sidewall defines a second receiving recess communicating with the first receiving cavity, the piezoelectric member is received in the first receiving recess, and the first magnetic member is received in the second receiving recess.

7. The piezoelectric actuator of claim 1, further comprising a detecting module for detecting a movement of the movable barrel, the detecting module comprises a Hall sensor arranged on the fixed barrel and a third magnetic member arranged on the movable barrel and opposite to the Hall sensor, the third magnetic member has a cylindrical structure, and the central axis of the third magnetic member is parallel with the optical axis.

8. The piezoelectric actuator of claim 7, wherein, the flexible circuit board is electrically connected to the Hall sensor.

9. The piezoelectric actuator of claim 1, wherein the thickness of the bracing sheet is in a range from 0.1 millimeters to 0.2 millimeters.

10. A camera module comprising:
a lens module having an optical axis associated therewith, and
a piezoelectric actuator for driving the lens module to move, the piezoelectric actuator comprising:
a fixed barrel, the fixed barrel defining a first receiving cavity;
a movable barrel received in the first receiving cavity, the movable barrel defining a second receiving cavity receiving the lens module;
a piezoelectric driving module for driving the movable barrel with the lens module to move relative to the fixed barrel along the optical axis, the piezoelectric driving module comprising a piezoelectric member attached on the sidewall of the fixed barrel, and a friction member attached on the sidewall of the movable barrel, the piezoelectric member being opposite to the friction member;
a flexible circuit board fixed on an outer surface of the fixed barrel, the flexible circuit board being electrically connected with the piezoelectric member;
a bracing sheet, the bracing sheet being attached around the flexible circuit board and fixing the piezoelectric member on the fixed barrel, and
a preloading module arranged between the fixed barrel and the movable barrel, the preloading module being opposite to the piezoelectric driving module for exerting a pressure on the movable barrel, thereby making the friction member resist against the piezoelectric member.

11. The camera module of claim 10, further comprising a guiding post parallel with the optical axis, the guiding post extending through the movable barrel to guide the movable barrel to move therealong.

12. The camera module of claim 10, wherein the piezoelectric member comprises a semi-cylindrical friction portion, the axis of the semi-cylindrical friction portion is perpendicular to the optical axis, and the friction member resists against the semi-circumference of the friction portion.

13. The camera module of claim 10, wherein the friction member has a cylindrical structure, and the central axis of the friction member is parallel with the optical axis.

14. The camera module of claim 10, wherein the preloading module includes a first magnetic member attached on the fixed barrel, and a second magnetic member attached on the movable barrel, the first magnetic member is opposite to the second magnetic member, and the first magnetic member and the second magnetic member are configured to generate a repel force.

15. The camera module of claim 14, wherein the fixed barrel comprises a first sidewall and a second sidewall opposite to the first sidewall, the first sidewall defines a first receiving recess communicating with the first receiving cavity, the second sidewall defines a second receiving recess communicating with the first receiving cavity, the piezoelectric member is received in the first receiving recess, and the first magnetic member is received in the second receiving recess.

16. The camera module of claim 10, further comprising a detecting module for detecting a movement of the movable barrel, the detecting module comprises a Hall sensor arranged on the fixed barrel, and a third magnetic member arranged on the movable barrel and opposite to the Hall sensor, the third magnetic member has a cylindrical structure, the central axis of the third magnetic member is parallel with the optical axis.

17. A portable electronic device comprising:
a main body, and
a camera module mounted on the main body, the camera module comprising:
a lens module having an optical axis associated therewith, and
a piezoelectric actuator for driving the lens module to move, the piezoelectric actuator comprising:
a fixed barrel, the fixed barrel defining a first receiving cavity passing through two opposite ends thereof;
a movable barrel received in the first receiving cavity, the movable barrel defining a second receiving cavity passing through two opposite ends thereof for receiving the lens module therein;
a piezoelectric driving module for driving the movable barrel to move relative to the fixed barrel along the optical axis of the lens module, the piezoelectric driving module comprising a piezoelectric member arranged on a sidewall of the fixed barrel, and a friction member arranged on a sidewall of the movable barrel, the piezoelectric member being opposite to the friction member;
a flexible circuit board fixed on an outer surface of the fixed barrel, the flexible circuit board being electrically connected with the piezoelectric member;
a bracing sheet, the bracing sheet being attached around the flexible circuit board and fixing the piezoelectric member on the fixed barrel, and
a preloading module arranged between the fixed barrel and the movable barrel, the preloading module being opposite to the piezoelectric driving module for exerting a pressure on the movable barrel, thereby making the friction member resist against the piezoelectric member.

18. The portable electronic device of claim 17, further comprising a guiding post parallel with the optical axis, the guiding post extending through the movable barrel to guide the movable barrel to move therealong.

19. The portable electronic device of claim 18, wherein the piezoelectric member comprises a semi-cylindrical friction portion, the axis of the semi-cylindrical friction portion is perpendicular to the optical axis, and the friction member resists against the semi-circumference of the friction portion.

20. The portable electronic device of claim 19, wherein the friction member has a cylindrical structure, and the central axis of the friction member is parallel with the optical axis.

* * * * *